United States Patent [19]

Takada

[11] Patent Number: 5,540,580

[45] Date of Patent: Jul. 30, 1996

[54] INJECTION MOLDING APPARATUS AND BLOW-MOLDING APPARATUS USING SAID INJECTION MOLDING APPARATUS

[75] Inventor: Minoru Takada, Ueda, Japan

[73] Assignee: Nissei Asb Machine Co., Ltd., Nagano-ken, Japan

[21] Appl. No.: 380,688

[22] Filed: Jan. 30, 1995

[30] Foreign Application Priority Data

Jan. 31, 1994 [JP] Japan .................................. 6-027448

[51] Int. Cl.$^6$ .................................................. B29C 49/06
[52] U.S. Cl. ........................ 425/539; 264/297.2; 425/540; 425/574
[58] Field of Search ......................... 264/297.2; 425/539, 425/540, 574, 575, 576

[56] References Cited

U.S. PATENT DOCUMENTS 5,030,406  7/1991  Sorensen ............................... 264/297.2

FOREIGN PATENT DOCUMENTS

58-52914  12/1983  Japan .

*Primary Examiner*—Tim Heitbrink
*Attorney, Agent, or Firm*—Oliff & Berridge

[57] ABSTRACT

An injection molding apparatus in which a hot-runner mold is moved with respect to the injection nozzle of an injection unit is disclosed. In a position in which the injection nozzle comes into contact is provided a first fixed link with a runner formed therein. A second fixed link with a runner formed therein is fixed to the hot-runner mold, and moves integrally with the hot-runner mold. Between these links is provided an intermediate runner block system, with runners formed therein. The intermediate runner block system is constructed from a first intermediate link supported rotatably by the first fixed link and a second intermediate link supported rotatably by the second fixed link, and these two intermediate links are also rotatably coupled together. This plurality of links forms a link construction, so that regardless of the movement of the hot-runner mold the resin path between the injection nozzle and the hot-runner mold is maintained.

20 Claims, 5 Drawing Sheets

INJECTION MOLDING APPARATUS AND BLOW-MOLDING APPARATUS USING SAID INJECTION MOLDING APPARATUS

BACKGROUND OF THE INVENTION

1. Field of the Invention

The present invention relates to an injection molding apparatus of the type having a hot-runner mold which moves relative to an injection nozzle of an injection unit, and to blow-molding apparatus using the same.

2. Description of the Prior Art

The Japanese Utility Model Publication No. 58-52914 discloses a blow-molding apparatus in which for each shot of injection-molding the product a hot-runner mold is driven vertically by a mold clamping ram. In this injection molding apparatus, it is not possible, because the hot-runner mold is raised and lowered, to maintain the injection nozzle of the injection unit in constant contact with the sprue of the hot-runner mold. As a result, when raising and lowering the hot-runner mold, it is necessary to withdraw the entire injection unit far enough that the hot-runner mold and injection nozzle do not interfere with each other.

If contact between the injection nozzle and hot-runner mold is lost, not only does leakage of resin occur from both the hot-runner mold sprue and the injection nozzle of the injection unit, but the stability of the molding is also impaired. For example, when the injection nozzle comes back in contact with the hot-runner mold sprue, air is trapped within the runner of the hot-runner mold, and this may lead to molding defects. Furthermore, the molten resin coming into contact with the atmosphere cools and solidifies, or is liable to contamination by air-borne contaminants, so that the flow of the resin is impaired and the molding characteristics worsened. These considerations are a large factor in the reduction of the molding yield.

SUMMARY OF THE INVENTION

The object of the present invention is the provision of an injection molding apparatus which, while of the type having a hot-runner mold which moves relative to an injection nozzle of an injection unit, is able to prevent leakage of resin from both the hot-runner mold sprue and the injection nozzle of the injection unit, but is also able to improve the stability of the molding, and of blow-molding apparatus using the same.

Another object of the present invention is the provision of an injection molding apparatus in which, while a movable runner block system which moves to follow the movement of the hot-runner mold is provided, there is no change in the volume of the resin flow path with the movement of the movable runner block system, and also of a blow-molding apparatus using the same.

The present invention provides an injection molding apparatus which charges with resin a cavity defined by clamping an injection core mold and an injection cavity mold, to form an injection-molded product, comprising:

an injection unit having an injection nozzle which injects said resin;

a hot-runner mold which is in contact with said injection cavity mold and has a sprue through which resin is introduced into, conveying the introduced resin to said injection cavity mold;

moving means for moving one of said hot-runner mold and said injection unit between a first position in which said sprue of said hot-runner mold and said injection nozzle of said injection unit are in opposition and a second position in which said sprue and said injection nozzle are not in opposition; and a movable runner block system provided between said injection nozzle of said injection unit and said sprue of said hot-runner mold, and which moves to follow the movement of one of said hot-runner mold and said injection unit while maintaining the contact with said sprue and with said injection nozzle.

According to the present invention, when the hot-runner mold moves relative to the injection unit, the movable runner block system also moves to follow the hot-runner mold so that the contact between the movable runner block system and both the sprue and injection nozzle is maintained. Leakage of resin from both the sprue and injection nozzle is thus prevented, as is the ingress of air or foreign bodies to the runners. For this reason, the stability of the injection molding process is improved, and the molding yield is raised. Moreover, by comparison with the conventional case in which the injection nozzle of the injection unit is alternately brought in contact and withdrawn, the time for the movement of the injection cylinder is eliminated, and the molding operation cycle time can be reduced.

Said moving means may be a mold clamping mechanism which moves said hot-runner mold to said first position when said injection cavity mold is to be clamped and moves said hot-runner mold to said second position when said injection cavity mold is to be opened.

Said movable runner block system may comprise a plurality of links whose ends are coupled so as to be mutually rotatable. In this case, a runner having an opening at each end is formed through each of said links, each runner communicating with the other at least in the rotary position of said plurality of links when said mold is clamped.

Since the movable runner block system has a link construction which rotates and moves with the relative movement of the hot-runner mold, even with the injection nozzle and hot-runner mold each constantly connected to the movable runner block system, the movement of the hot-runner mold can be carried out smoothly. Since the runners of the movable runner block system form a continuous path for resin from one end to the other, at least during the injection operation, resin can be supplied from the injection nozzle to the hot-runner mold. Since the movable runner block system with this link construction follows the relative movement of the hot-runner mold by means of rotation, it may be constructed of rigid body, with no change in the volume of the resin flow path through the runners before and after movement. This serves to prevent the entrapment of air in the runners, and also helps to stabilize the molding.

It is preferable that a plurality of said links are aligned on the line joining said injection nozzle to said sprue and opposing faces of said plurality of links are brought into close contact by nozzle contact pressure of said injection nozzle when said injection cavity mold is clamped.

By this means, the nozzle contact pressure of the injection nozzle can be transmitted by the aligned plurality of links to be received by the hot-runner mold. As a result, the unit may be designed with the mechanical strength of the element supporting the movable runner block system low.

It is preferable that said movable runner block system comprises:

a first fixed link, supported in a position where said injection nozzle is brought into contact, and having formed therein a first runner which has first openings at both upstream and downstream ends, and wherein said first runner communicates with said injection nozzle;

a second fixed link, fixed to said hot-runner mold, having formed therein a second runner which has second openings at both upstream and downstream ends, and wherein said second runner communicates with said sprue;

a first intermediate link, rotatably coupled to said first fixed link, and having formed therein a third runner which has third openings at both upstream and downstream ends, and wherein said third runner communicates with said first runner on mold clamping;

a second intermediate link, rotatably coupled to said second fixed link and said first intermediate link, and having formed therein a fourth runner which has fourth openings at both upstream and downstream ends, and wherein said fourth runner communicates with said second and third runners on mold clamping.

With this construction, the injection nozzle is in constant contact with the first fixed link, and the sprue of the hot-runner mold is in constant contact with the second fixed link, yet the rotation of the first and second intermediate links provided between the two fixed links allows for the relative movement of the hot-runner mold.

It is preferable that the injection molding apparatus further comprises:

a support element which supports said first fixed link in a state allowing it to be advanced or withdrawn toward said injection nozzle; and urging means for urging said first fixed link in a direction such that said first opening at the upstream end of said first fixed link contacts said injection nozzle.

In this construction, even after the nozzle contact pressure of the injection nozzle is released, the contact pressure between said injection nozzle and the upstream first opening can be maintained. As a result of this, the leakage of resin or the penetration of air can be reliably prevented.

It is preferable that each of said first and second fixed links has an axial rotation portion of which the cross section is circular;

said first opening on the downstream side is formed facing the circumferential surface forming the periphery of said axial rotation portion of said first fixed link;

said second opening on the upstream side is formed facing the circumferential surface forming the periphery of said axial rotation portion of said second fixed link;

said first and second intermediate links have circular holes into which are inserted said axial rotation portions;

said third opening on the upstream side is formed facing the inner surface of said hole in said first intermediate link; and said fourth opening on the downstream side is formed facing the inner surface of said hole in said second intermediate link.

By the adoption of this construction, said first, second, third, and fourth runners mutually communicate only when said injection cavity mold is clamped.

Furthermore, in this construction, it is preferable that said first and second fixed links are aligned on the line joining said injection nozzle to said sprue. By this means, the nozzle contact pressure of the injection nozzle is transmitted through the fixed links to be received by the hot-runner mold, when said injection cavity mold is clamped.

It is preferable that:

said first fixed link has a first end surface in which said first opening on the downstream side is formed;

said second fixed link has a second end surface in which said second opening on the upstream side is formed;

said first intermediate link has a third end surface which makes surface contact with said first end surface, and said third opening on the upstream side is formed in said third end surface; and said second intermediate link has a fourth end surface which makes surface contact with said second end surface, and said fourth opening on the downstream side is formed in said fourth end surface.

By means of this construction, said first, second, third, and fourth runners constantly mutually communicate.

Also in this construction, it is preferable that said first intermediate link has a fifth end surface parallel to said third end surface;

said second intermediate link has a sixth end surface parallel to said fourth end surface; and when said injection cavity mold is clamped, part of said first and second intermediate links and said first and second fixed links are aligned on the line joining said injection nozzle to said sprue.

In this construction, said fifth end surface of said first intermediate link and said sixth end surface of said second intermediate link are brought into close contact by the nozzle contact pressure of said injection nozzle. By this means, the contact pressure of the injection nozzle can be transmitted to the hot-runner mold.

The present invention can also be applied to the injection molding station of a blow-molding apparatus.

The blow-molding apparatus comprises at least:

an injection molding station in which a cavity defined by clamping an injection core mold and an injection cavity mold against a neck mold is charged with a resin to injection-mold a preform;

a blow-molding station in which a container is blow-molded from said preform held in said neck mold; and transfer means for transferring said neck mold between said stations.

In a blow-molding apparatus of this type, in order to transfer the preform after the preform injection molding operation to the next process, it is necessary for example to lower an injection cavity mold. The hot-runner mold therefore also moves together with the injection cavity mold. By adopting the present invention in such a blow-molding apparatus, it is no longer necessary when moving the hot-runner mold to first withdraw the injection unit to a position where it does not interfere with the movement of the hot-runner mold.

PREFERRED EMBODIMENTS OF THE INVENTION

The present invention is now described in terms of preferred embodiments of the injection molding apparatus, with reference to the drawings.

Figure 1:
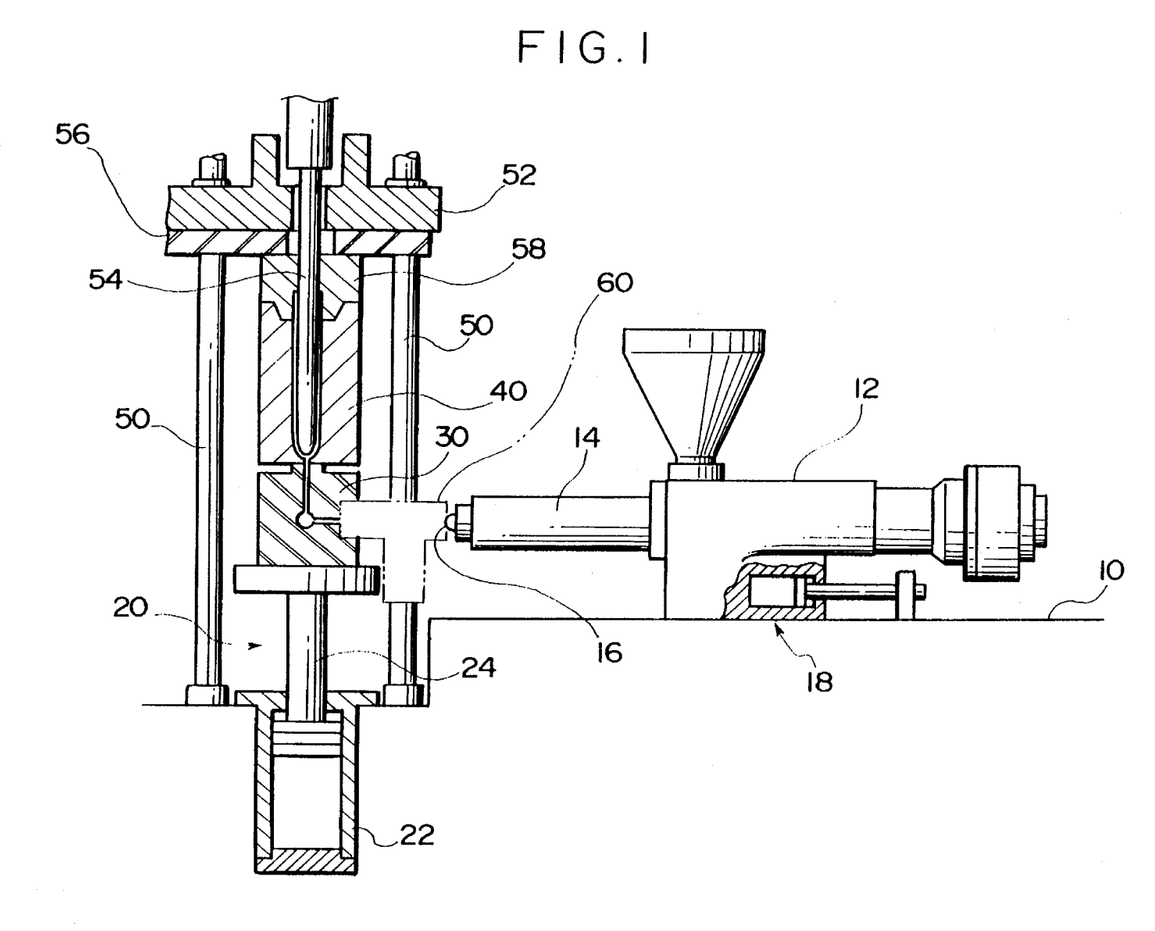
FIG. 1 is a schematic illustration of an embodiment of a blow-molding apparatus to which the present invention is applied.

FIG. 1 is an illustration of an embodiment of the present invention applied to an injection molding station of a blow-molding apparatus using the hot parison technique. This figure shows the injection molding station of the blow-molding apparatus. In FIG. 1, on a base 10 are provided an injection unit 12 and mold clamping device 20. The injection unit 12 has an injection cylinder 14 which can be advanced and withdrawn on the base 10 by means of a hydraulic cylinder 18. By driving the injection cylinder 14 forward, an injection nozzle 16 on the end thereof can be brought into contact at a predetermined pressure with a movable runner block system 60 described below.

The mold clamping device 20 has a cylinder 22 and a mold clamping ram 24 which can be driven to advance or withdraw with respect to the cylinder 22. A hot-runner mold 30 is fixed to the upper extremity of this mold clamping ram 24, and an injection cavity mold 40 is in turn fixed to the upper extremity of this hot-runner mold 30.

A plurality of tie rods 50 are erected on the base 10, and the upper end of each of the tie rods 50 is provided with a pressure plate 52. This pressure plate 52 supports an injection core mold 54 which can be driven vertically to open or clamp the mold by a mold clamping device not shown in the figure. Below the pressure plate 52, a rotary disc 56 is supported rotatably. This rotary disc 56 supports a neck mold 58 which forms the cavity mold for forming the neck portion of a preform. When injection molding at an injection molding station is completed, intermittent rotation of the rotary disc 56 allows the preform to be transferred to the next stage while supported by the neck mold 68.

Although not shown in the figure, the blow-molding apparatus is also provided with a blow-molding station at the position where the neck mold 58 comes to rest as a result of the intermittent rotation of the rotary disc 66. At this blow-molding station, a bottle is blow-molded from the preform supported by the neck mold 68. It is also possible, if necessary, to provide a temperature control station at a position intermediate between the injection molding station and the blow-molding station at which the neck mold 58 comes to rest. Such a temperature control station performs temperature control to bring the preform, which retains the heat of the injection molding operation, to an appropriate temperature for blow-molding. It is also possible to provide an eject station for ejecting a bottle from the neck mold 58, at a position intermediate between the blow-molding station and the injection molding station at which the neck mold 58 comes to rest.

Figure 2:
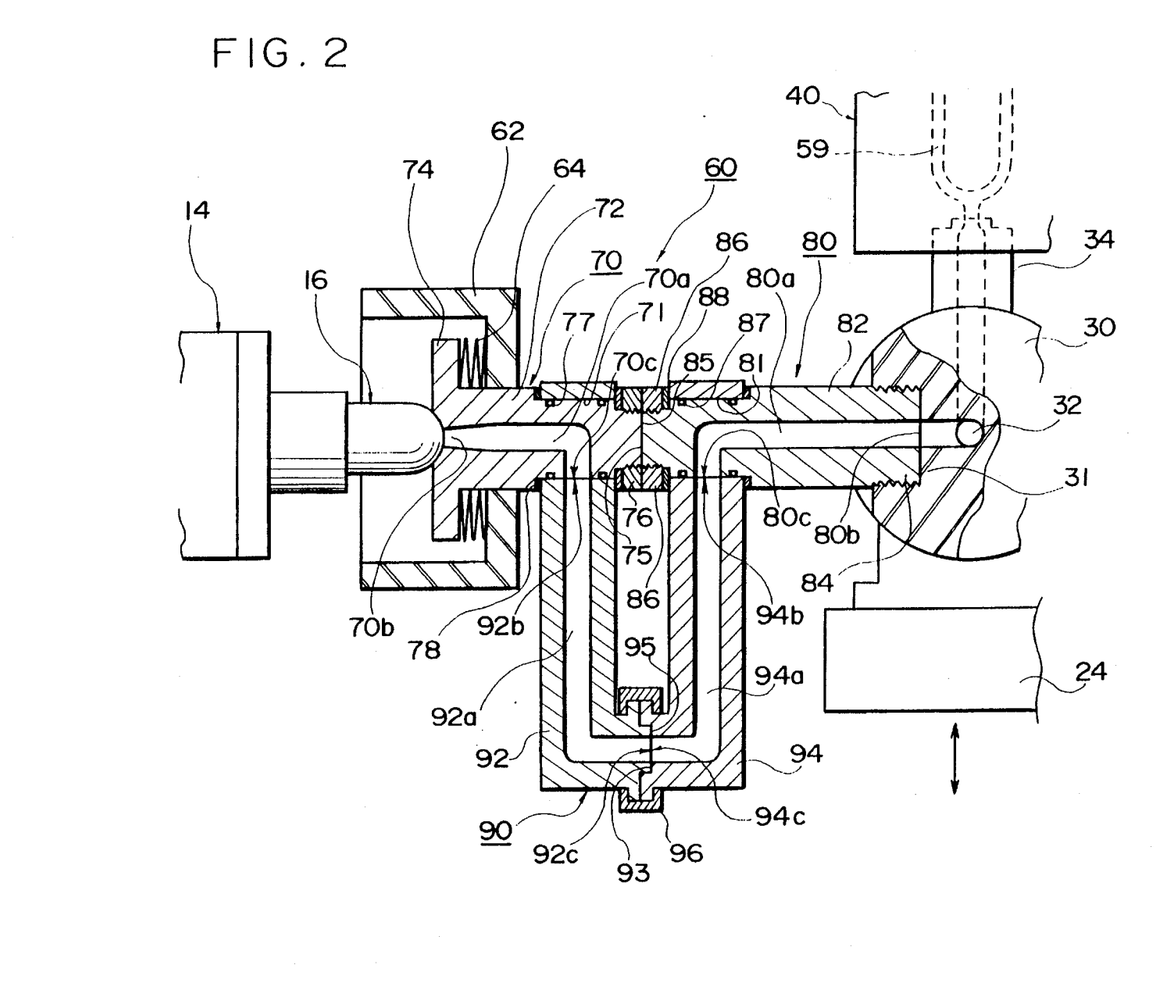
FIG. 2 is a sectional diagram showing a movable runner block system between the injection nozzle and hot-runner mold of the apparatus shown in FIG. 1.

A characteristic of this embodiment is that the injection nozzle 16 of the injection unit 12 is not brought directly into contact with the hot-runner mold 30, but instead a movable runner block system 60 is provided between the two. As shown in FIG. 2, the movable runner block system 60 can be broadly divided into a first fixed link 70 provided on the side of the injection nozzle 16, a second fixed link 80 provided on a sprue 31 of the hot-runner mold 30, and an intermediate runner block system 90 provided between the first and second fixed links 70 and 80.

The first fixed link 70 comprises a shaft portion 72 having a runner 70a formed as an internal through-hole, and a flange portion 74 positioned at the end of the shaft portion 72 closer to the injection nozzle 16. The runner 70a communicates at an opening 70b at its upstream end, with the injection nozzle 16. At the downstream end, the runner 70a is bent downward and an opening 70c on the downstream side of the runner 70a is formed facing on the circumferential surface of the shaft portion 72 which is a rotary axis and whose cross section is circular, and around the opening 70c are provided a heat-resistant sealing material 77 and heat-resistant rotary bearings 78.

The first fixed link 70 is supported by a support element 62 so as to be movable in the axial direction of the shaft portion 72. Furthermore, between the support element 62 and flange portion 74 is provided an urging element such as a compression coil spring 64 which urges the first fixed link 70 in the direction of contacting the injection nozzle 16. The support element 62 is fixedly supported by the base 10.

The second fixed link 80 moves integrally with the hot-runner mold 30, and a shaft portion 82 having a runner 80a formed therein has formed at one end a screw thread 84, which is screwed into a thread groove formed in the sprue 31 of the hot-runner mold 30. The other end surface 85 of the shaft portion 82, as shown in FIG. 2, is opposed to the end surface 75 of the first fixed link 70 during the injection molding process. The runner 80a communicates at an opening 80b at its downstream end, with a runner 32 within the hot-runner mold 30. Again, at the upstream end, the runner 80a is bent downward and an opening 80c on the upstream side of the runner 80a is formed facing on the circumferential surface of the shaft portion 82 which is a rotary axis and whose cross section is circular, and around this opening 80c are provided a heat-resistant sealing material 87 and heat-resistant rotary bearings 88. In FIG. 2, the elements 76 and 86 function as pressure plates as well as fixing nuts for the heat-resistant rotary bearings 78 and 88.

The intermediate runner block system 90 linking the first and second fixed links 70 and 80 comprises first and second intermediate links 92 and 94. These intermediate links 92 and 94 are formed substantially symmetrically about the plane of abutment of the first and second fixed links 70 and 80. Specifically, the intermediate links 92 and 94 have at their upper ends circular holes 71 and 81 into which are inserted the shaft portions 72 and 82 of the first and second fixed inks 70 and 80, and the intermediate links 92 and 94 are rotatably supported by the rotary bearings 78 and 88, respectively. The lower ends of the first and second intermediate links 92 and 94 are bent to face each other, and at their point of opposition are rotatably coupled by a rotary bearing 96. Like the other rotary bearings 78 and 88, the rotary bearing 96 should also preferably be constructed as a heat-resistant bearing. The first and second intermediate links 92 and 94 also have runners 92a and 94a formed therein, respectively. The runners 92a and 94a have openings 92b and 94b formed at their upper ends and facing the interior of the circular boles 71 and 81, respectively. The upper openings 92b and 94b of the runners 92a and 94a communicate with the openings 70c and 80c of the runners 70a and 80a formed in the first and second fixed links 70 and 80, respectively. Lower openings 92c and 94c in the runners 92a and 94a face each other, and communicate constantly. Leakage of resin from the contact portion of the lower openings 92c and 94c is prevented by engaging a convex portion 93 with a concave portion 95, as shown in FIG. 2. Lower openings 92c and 94c can be formed equal to upper openings 92b and 94b instead of the structure shown in FIG. 2.

Although not shown in the figure, the first and second fixed links 70 and 80 and the intermediate runner block system 90 are provided with temperature control means to maintain the molten state of the resin remaining in the runners. These temperature control means may comprise for example a rod-shaped heater provided axially along a runner, a heat pipe with a source of heat at one end, or a band heater wrapped around the link periphery.

Next the operation of the injection molding apparatus is described.

Figure 4:
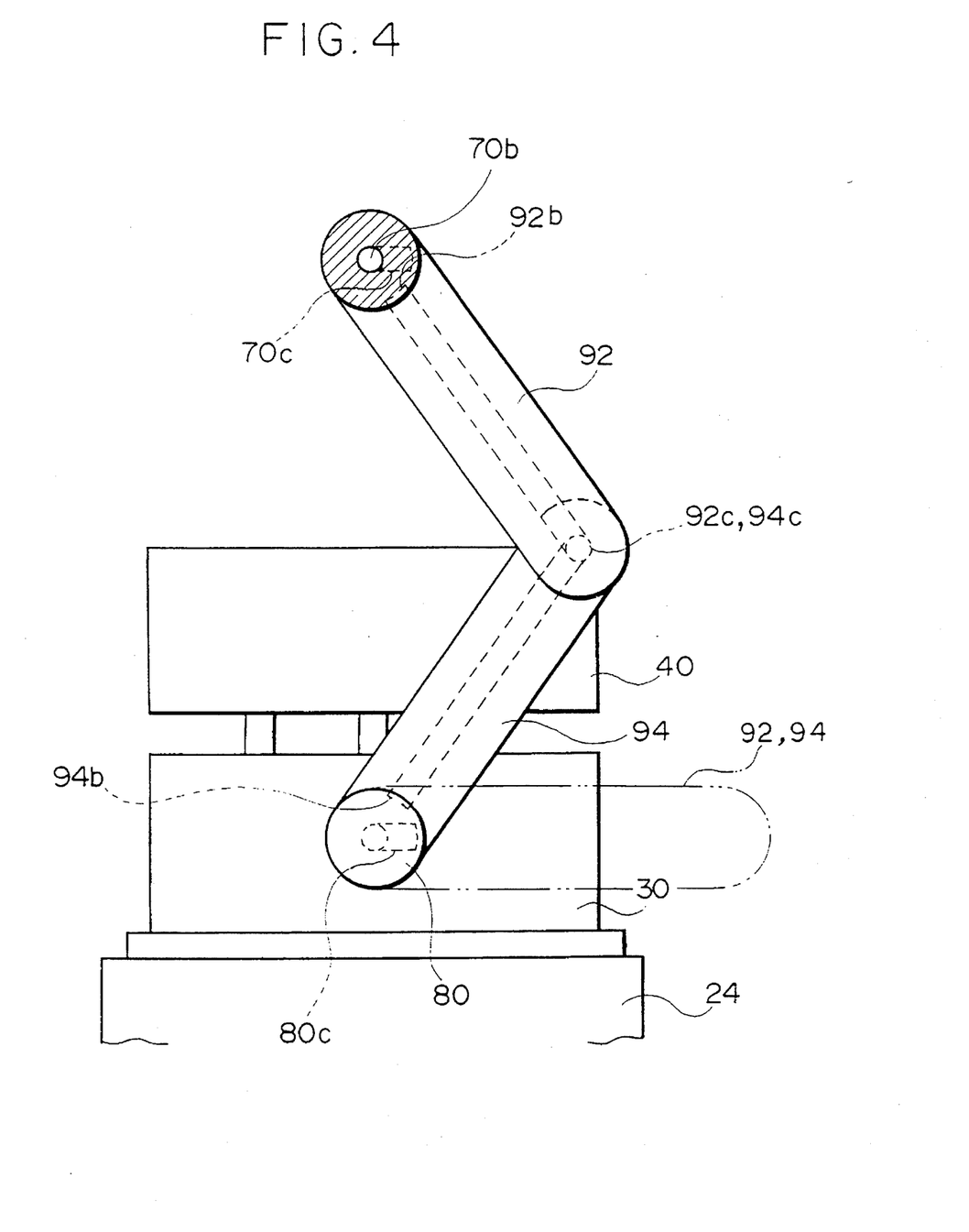
FIG. 4 is a schematic illustration of the positional relationship between first and second intermediate links when the hot-runner mold shown in FIG. 1 is opened.

FIG. 2 shows the process of injection molding. FIG. 2 illustrates that the first and second intermediate links 92 and 94 are disposed parallel to the vertical movement of the hot-runner mold 30. Nevertheless, as shown in FIG. 4 said links are actually disposed perpendicular to said direction. Further, in this state the first and second fixed links 70 and 80 are aligned coaxially between the injection nozzle 16 and the hot-runner mold 30. Thereafter, by operation of the hydraulic cylinder 18 shown in FIG. 1, the injection cylinder 14 is moved slightly forward, and the injection nozzle 16 is brought into contact with the flange portion 74 of the first fixed link 70 at an appropriate contact pressure. This enables leakage of resin from between the injection nozzle 16 and the flange portion 74 to be averted even when resin is supplied at an appropriate injection pressure through the injection nozzle 16. During the injection, the first and second fixed links 70 and 80 are aligned coaxially, and thus the pressure plates 76 and 86 are brought into close contact by the pressure from the nozzle. As a result of this alignment and adjacency, the pressure from the nozzle can be received by the first and second fixed links 70 and 80 and the hot-runner mold 30. There is therefore no requirement for excessive mechanical strength in the support element 62.

The resin injected from the injection nozzle 16 passes through the runners of the first and second fixed links 70 and 80 and the intermediate runner block system 90, to enter the runner 32 of the hot-runner mold 30, then further passes through a hot-runner nozzle 34 to fill a cavity 59 defined by the injection cavity mold 40, the injection core mold 54, and the neck mold 58.

After the cavity has been charged with a predetermined amount of resin, the injection unit 12 continues to apply a predetermined nozzle contact pressure and resin charging pressure. This ensures that the pressure is maintained for an adequate period to enable the resin to cool and solidify in the cavity. After the resin has cooled sufficiently in the cavity, an injection screw in the injection unit 12 is withdrawn by rotation, and then a measurement operation is started to measure an amount of resin for the next one shot. Following this, the hydraulic cylinder 18 shown in FIG. 1 is operated, and the injection cylinder 14 is withdrawn a very short distance in order to remove the nozzle contact pressure. After that, the mold clamping device 20 begins the operation of opening the injection cavity mold 40.

When the nozzle contact pressure of the injection unit 12 is released, it is only necessary for the injection nozzle 16 to be withdrawn by a very short distance to the left as shown 15 in FIG. 2 from the flange portion 74 of the first fixed link 70. The flange portion 74 of the first fixed link 70 is, however, constantly urged leftward as shown in FIG. 2 by the spring 64 disposed between the flange portion 74 and the support element 62. As a result, regardless of the withdrawal of the injection nozzle 16, the contact between the injection nozzle 16 and the flange portion 74 can be maintained. Even, therefore, when the nozzle contact pressure is removed, leakage of resin from between the injection nozzle 16 and the flange portion 74 is prevented.

Furthermore, by the removal of the nozzle contact pressure described above, a slight gap opens up between the pressure plates 76 and 86 disposed on opposing surfaces of the first and second fixed links 70 and 80.

In this state, the mold clamping ram 24 of the mold clamping device 20 shown in FIG. 1 is driven downward. This operation also drives the hot-runner mold 30 and injection cavity mold 40 vertically downward, integrally with the mold clamping ram 24. At this point, since the second fixed link 80 is screwed into the hot-runner mold 30, as the abovementioned mold-opening operation is carried out, a relative positional displacement between the first fixed link 70 and the second fixed link 80 occurs.

In this embodiment, the construction adopted is such that even when this relative positional displacement occurs, it is not accompanied by a change in the volume of the resin path in the runners joining the injection nozzle 16 and the hot-runner mold 30, and the connectional relationships of the runners can be maintained. That is to say, the first and second intermediate links 92 and 94 together with the first and second fixed links 70 and 80 form a link construction, and both ends of the first and second intermediate links 92 and 94 form rotatable couplings. As a result, even when the positional relationship in the vertical direction of the first and second fixed links 70 and 80 is changed, rotation of the first and second intermediate links 92 and 94 forming this link construction enables the coupling relationship between the two to be maintained.

Figure 3:
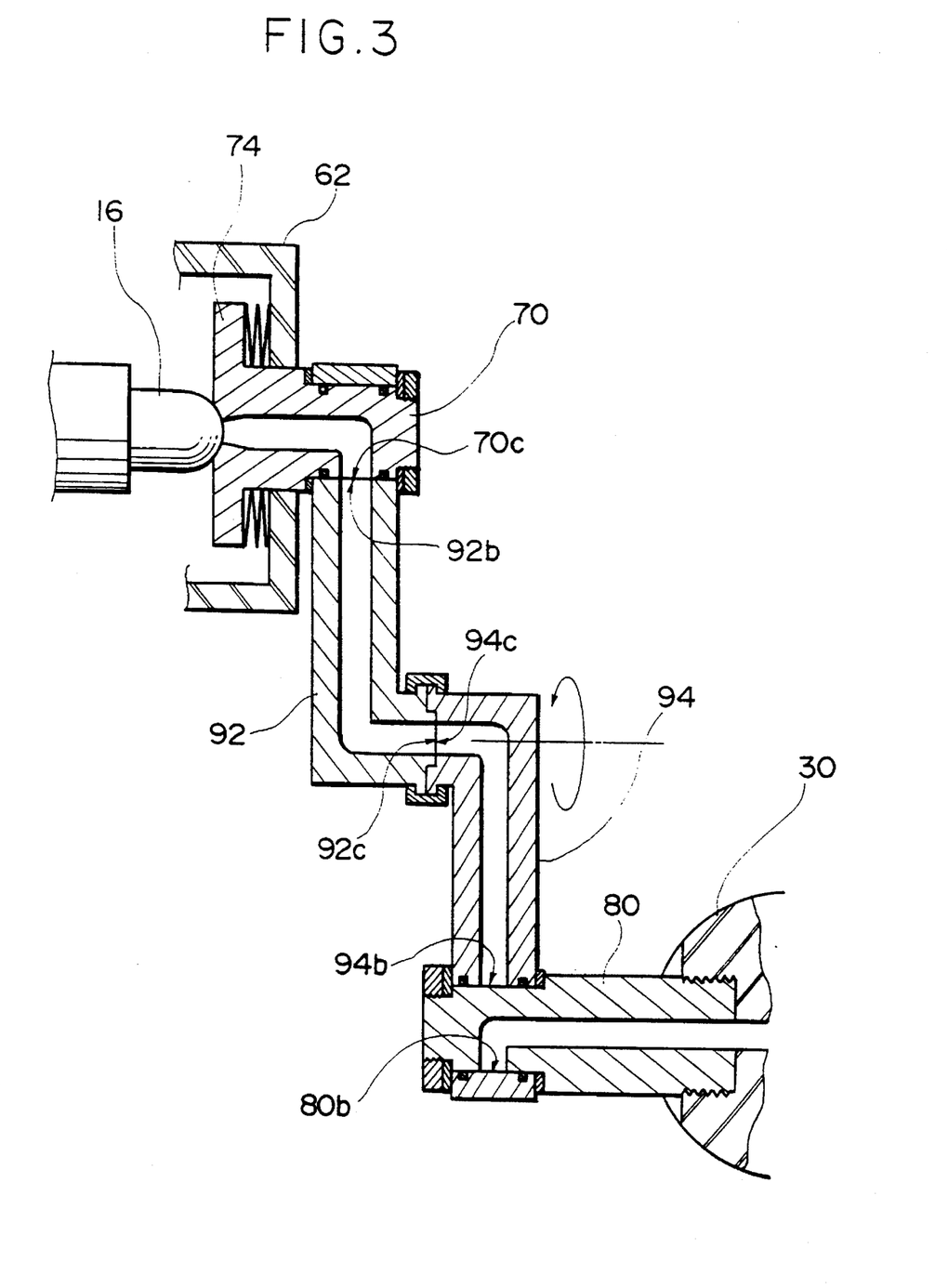
FIG. 3 is a sectional diagram showing the movable runner block system when the hot-runner mold shown in FIG. 1 is opened.

FIG. 3 and FIG. 4 show the position after the completion of the mold-opening operation with respect to the injection cavity mold 40 and hot-runner mold 30. In these figures, the first intermediate link 92 has rotated with respect to the first fixed link 70, and the second intermediate link 94 has rotated with respect to the second fixed link 80. Additionally, the first and second intermediate links 92 and 94 have rotated with respect to each other. In this embodiment, by the disposal of the links in the arrangement shown in FIG. 4, a relative positional displacement occurs between the runner openings 70c and 92b of the first fixed link 70 and the first intermediate link 92. Similarly, a relative positional displacement occurs between the runner openings 80c and 94b of the second fixed link 80 and the second intermediate link 94. Since, however, there is no change in the volume of the runners in the links, problems such as the entrapment of air are avoided. Since, moreover, the first and second fixed links 70 and 80 and the intermediate runner block system 90 are provided with temperature control means able to maintain the resin in the molten state, problems such as clogging of the runners by resin can be avoided.

When the hot-runner mold 30 and injection cavity mold 40 are in the fully opened positions, it is preferred that the first and second intermediate links 92 and 94 come to rest at a crossed axis angle as shown in FIG. 4. If the first and second intermediate links 92 and 94 are to be aligned coaxially in the vertical direction, when thereafter the hot-runner mold 30 is raised, no rotational moment acts on the first and second intermediate links 92 and 94, and there is a danger that an excessive stress will be applied to the links 92 and 94, with a possibility of breakage. Even supposing that a rotational moment does act on the first and second intermediate links 92 and 94, the linkage point of the two intermediate links is not restricted to lying to the right of the central axis as shown in FIG. 4, but has also the possibility of movement to a leftward position, and thus a stable clamping operation of the mold is no longer possible.

In this embodiment, compared with the case in which the injection nozzle 16 is brought directly into contact with the hot-runner mold 30, the path of the resin is lengthened. The lengthening of the resin path, however, is determined by the mold-opening stroke, and even when injection molding a relatively long preform, for example, as shown in this embodiment, a mold-opening stroke of 250 mm at maximum will be sufficient. The increased length of the resin path due to the movable runner block system 60 to enable a mold-opening stroke of this order of magnitude will not have a detrimental effect on the quality of the molded product.

It should be noted that the present invention is not restricted to the embodiment described above, and various modifications are possible within the scope of the present invention. For example, in the embodiment described above, the openings 70c and 80c in the first and second fixed links 70 and 80 are formed on the circumferential surface of the shaft portions 72 and 82, respectively. As a result, with the rotary movement of the first and second intermediate links 92 and 94, communication between the runner openings 70c and 92b and between the runner openings 80c and 94b is not continuous.

Figure 5:
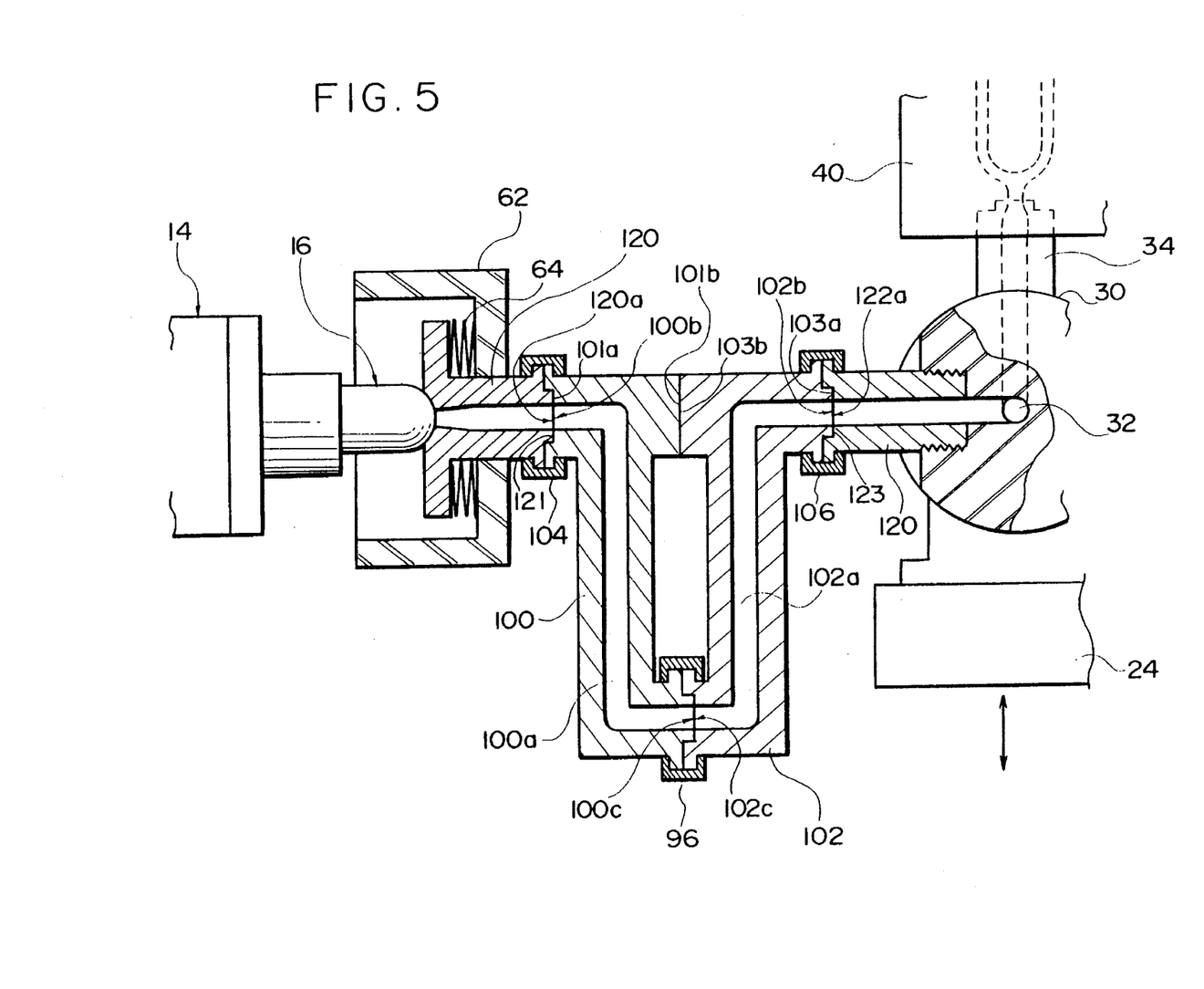
FIG. 5 is a schematic illustration elucidating the modification which allows a state of constant communication through the runners of the links.

This problem can be solved by the adoption of the construction shown in the embodiment of FIG. 5. In this figure, openings 100c and 102c at the lower ends of runners 100a and 102a in first and second intermediate links 100 and 102 are formed in opposing end surfaces of the shaft portions in the same way as shown in FIG. 2, so as to be constantly communicating. Similarly, upper end openings 100b and 102b in the first and second intermediate links 100 and 102 are formed in the end surfaces 101a and 103a opposing the end surfaces 121 and 123 of first and second fixed links 120 and 122, respectively. As a result, runner opening 120a and the upper end opening 100b constantly oppose each other, regardless of the rotary position of the first intermediate link 100. Similarly, runner opening 122a and the upper end opening 102b constantly oppose each other, regardless of the rotary position of the second intermediate link 102. Not only, therefore, during the injection operation as shown in FIG. 5, but also for example when the hot-runner mold 30 is opened, a constant path of communication for the resin is ensured, from the injection nozzle 16 to the hot-runner mold 30. The rotary couplings 104 and 106 may be positioned to cover the periphery of the opposing runner openings. In the embodiment shown in FIG. 5, opposing end surfaces 101b and 103b of the first and second intermediate links 100 and 102 are positioned in adjacency. In this way, during the injection molding operation as shown in FIG. 5, parts of the first and second intermediate links 100 and 102 are positioned between the first and second fixed links 120 and 122, and because these links are all in contact in a 11near arrangement, the contact pressure of the nozzle can be received in the same way as in the embodiment shown in FIG. 2.

The hot-runner mold 30 is normally opened by movement in the direction perpendicular to the direction of extension of the injection cylinder 14 of the injection unit 12, and therefore to permit the movement of the hot-runner mold 30, the intermediate runner block system 90 should be constructed of at least two links.

The present invention is not necessarily restricted to application to the mold clamping apparatus of an injection molding station in a blow-molding apparatus, but may also be applied in a similar way to a variety of injection molding devices. Furthermore, the blow-molding apparatus is not restricted to the rotary type as described above, but the neck mold 58 may also be transferred linearly. It is also possible for the mold clamping device to move the hot-runner mold 30 in a horizontal direction as distinct from the embodiments shown in FIGS. 2 and 5, and the present invention may similarly be applied to this type of mold clamping device. Again the present invention is not restricted necessarily to moving the hot-runner mold 30, but may instead be applied when moving the injection unit in a similar way.

I claim:

1. An injection molding apparatus which introduces a resin into a cavity to form an injection-molded product, said cavity defined by an injection core mold clamped against an injection cavity mold, said molding apparatus comprising:

an injection unit having an injection nozzle which injects said resin;

a hot-runner mold which is in contact with said injection cavity mold and has a sprue through which said resin is introduced, the introduced resin flowing through said sprue and into said injection cavity mold;

moving means for moving one of said hot-runner mold and said injection unit between a first position in which said sprue of said hot-runner mold and said injection nozzle of said injection unit are in opposition and a second position in which said sprue and said injection nozzle are not in opposition; and a movable runner block system provided between said injection nozzle of said injection unit and said sprue of said hot-runner mold, said movable runner block system moving to follow movement of one of said hot-runner mold and said injection unit while maintaining contact with said sprue and with said injection nozzle.

2. The injection molding apparatus of claim 1, wherein said moving means is a mold clamping mechanism which moves said hot-runner mold to said first position when said injection cavity mold is to be clamped and moves said hot-runner mold to said second position when said injection cavity mold is to be opened.

3. The injection molding apparatus of claim 2, wherein said movable runner block system comprises a plurality of links whose ends are coupled so as to be mutually rotatable, and a runner having an opening at each end is formed through each of said links, each runner communicating with other at least in the rotary position of said links when said injection cavity mold is clamped.

4. The injection molding apparatus of claim 3, wherein a plurality of said links are aligned on the line joining said injection nozzle to said sprue and opposing faces of said plurality of links are brought into close contact by nozzle contact pressure of said injection nozzle when said injection cavity mold is clamped.

5. The injection molding apparatus of claim 2, wherein said movable runner block system comprises:

a first fixed link, supported in a position where said injection nozzle is brought into contact, and having formed therein a first runner which has first openings at both upstream and downstream ends, and wherein said first runner communicates with said injection nozzle;

a second fixed link, fixed to said hot-runner mold, having formed therein a second runner which has second openings at both upstream and downstream ends, and wherein said second runner communicates with said sprue;

a first intermediate link, rotatably coupled to said first fixed link, and having formed therein a third runner which has third openings at both upstream and downstream ends, and wherein said third runner communicates with said first runner on mold clamping;

a second intermediate link, rotatably coupled to said second fixed link and said first intermediate link, and having formed therein a fourth runner which has fourth openings at both upstream and downstream ends, and wherein said fourth runner communicates with said second and third runners on mold clamping.

6. The injection molding apparatus of claim 5, further comprising:

a support element which supports said first fixed link in a state allowing it to be advanced or withdrawn toward said injection nozzle; and urging means for urging said first fixed link in a direction such that said first opening at the upstream end of said first fixed link contacts said injection nozzle;

whereby even after nozzle contact pressure of the injection nozzle is released, the contact between said injection nozzle and the upstream first opening is maintained.

7. The injection molding apparatus of claim 5, wherein:

each of said first and second fixed links has a rotation axis portion of which the cross section is circular;

said first opening on the downstream side is formed facing the circumferential surface of said rotation axis portion of said first fixed link;

said second opening on the upstream side is formed facing the circumferential surface of said rotation axis portion of said second fixed link;

said first and second intermediate links have circular holes into which are inserted said rotation axis portions;

said third opening on the upstream side is formed facing the inner surface of said hole in said first intermediate link;

said fourth opening on the downstream side is formed facing the inner surface of said hole in said second intermediate link; and said first, second, third, and fourth runners mutually communicate when said injection cavity mold is clamped.

8. The injection molding apparatus of claim 7, wherein said first and second fixed links are aligned on the line joining said injection nozzle to said sprue, and opposing faces of said first and second fixed links are brought into close contact by the nozzle contact pressure of said injection nozzle when said injection cavity mold is clamped.

9. The injection molding apparatus of claim 5, wherein:

said first fixed link has a first end surface in which said first opening on the downstream side is formed;

said second fixed link has a second end surface in which said second opening on the upstream side is formed;

said first intermediate link has a third end surface which makes surface contact with said first end surface, and said third opening on the upstream side is formed in said third end surface;

said second intermediate link has a fourth end surface which makes surface contact with said second end surface, and said fourth opening on the downstream side is formed in said fourth end surface; and said first, second, third, and fourth runners constantly mutually communicate.

10. The injection molding apparatus of claim 9, wherein:

said first intermediate link has a fifth end surface parallel to said third end surface;

said second intermediate link has a sixth end surface parallel to said fourth end surface;

when said injection cavity mold is clamped, part of said first and second intermediate links and said first and second fixed links are aligned on the line joining said injection nozzle to said sprue, and said fifth end surface of said first intermediate link and said sixth end surface of said second intermediate link are brought into close contact by nozzle contact pressure of said injection nozzle.

11. A blow-molding apparatus comprising at least:

an injection molding station in which a cavity defined by clamping an injection core mold and an injection cavity mold against a neck mold is introduced with a resin to injection-mold a preform;

a blow-molding station in which a container is blow-molded from said preform held in said neck mold; and transfer means for transferring said neck mold between said stations;

wherein said injection molding station comprises:

an injection unit having an injection nozzle which injects said resin;

a hot-runner mold which is in contact with said injection cavity mold and has a sprue through which said resin is introduced, the introduced resin flowing through said sprue and into said injection cavity mold;

moving means for moving one of said hot-runner mold and said injection unit between a first position in which said sprue of said hot-runner mold and said injection nozzle of said injection unit are in opposition and a second position in which said sprue and said injection nozzle are not in opposition; and a movable runner block system provided between said injection nozzle of said injection unit and said sprue of said hot-runner mold, said movable runner block system moving to follow movement of one of said hot-runner mold and said injection unit while maintaining contact with said sprue and with said injection nozzle.

12. The blow-molding apparatus of claim 11, wherein said moving means is a mold clamping mechanism which raises said hot-runner mold to said first position when said injection cavity mold is to be clamped, and lowers said hot-runner mold to said second position when said injection cavity mold is to be opened.

13. The blow-molding apparatus of claim 12, wherein said movable runner block system comprises a plurality of links whose ends are coupled so as to be mutually rotatable, and a runner having an opening at each end is formed through each of said links, each runner communicating with the other at least in the rotary position of said links when said injection cavity mold is clamped.

14. The blow-molding apparatus of claim 13, wherein a plurality of said links are aligned on the line joining said injection nozzle to said sprue when said injection cavity mold is clamped, and opposing faces of said plurality of links are brought into close contact by nozzle contact pressure of said injection nozzle.

15. The blow-molding apparatus of claim 12, wherein said movable runner block system comprises:

a first fixed link, supported in a position where said injection nozzle is brought into contact, and having formed therein a first runner which has first openings at both upstream and downstream ends, and wherein said first runner communicates with said injection nozzle;

a second fixed link, fixed to said hot-runner mold, having formed therein a second runner which has second openings at both upstream and downstream ends, and wherein said second runner communicates with said sprue;

a first intermediate link, rotatably coupled to said first fixed link, and having formed therein a third runner which has third openings at both upstream and downstream ends, and wherein said third runner communicates with said first runner on mold clamping;

a second intermediate link, rotatably coupled to said second fixed link and said first intermediate link, and having formed therein a fourth runner which has fourth openings at both upstream and downstream ends, and wherein said fourth runner communicates with said second and third runners on mold clamping.

16. The blow-molding apparatus of claim 15, further comprising:

a support element which supports said first fixed link in a state allowing it to be advanced or withdrawn toward said injection nozzle; and urging means for urging said first fixed link in a direction such that said first opening at the upstream end of said first fixed link contacts said injection nozzle;

whereby even after nozzle contact pressure of the injection nozzle is released, the contact between said injection nozzle and the upstream first opening is maintained.

17. The blow-molding apparatus of claim 15, wherein:

each of said first and second fixed links has a rotation axis portion of which the cross section is circular;

said first opening on the downstream side is formed facing the circumferential surface forming the periphery of said rotation axis portion of said first fixed link;

said second opening on the upstream side is formed facing the circumferential surface forming the periphery of said rotation axis portion of said second fixed link;

said first and second intermediate links have circular holes into which are inserted said rotation axis portions;

said third opening on the upstream side is formed facing the inner surface of said hole in said first intermediate link;

said fourth opening on the downstream side is formed facing the inner surface of said hole in said second intermediate link; and said first, second, third, and fourth runners mutually communicate when said injection cavity mold is clamped.

18. The blow-molding apparatus of claim 17, wherein said first and second fixed links are aligned on the line joining said injection nozzle to said sprue, and opposing faces of said first and second fixed links are brought into close contact by nozzle contact pressure of said injection nozzle when said injection cavity mold is clamped.

19. The blow-molding apparatus of claim 15, wherein:

said first fixed link has a first end surface in which said first opening on the downstream side is formed;

said second fixed link has a second end surface in which said second opening on the upstream side is formed;

said first intermediate link has a third end surface which makes surface contact with said first end surface, and said third opening on the upstream side is formed in said third end surface;

said second intermediate link has a fourth end surface which makes surface contact with said second end surface, and said fourth opening on the downstream side is formed in said fourth end surface; and said first, second, third, and fourth runners constantly mutually communicate.

20. The blow-molding apparatus of claim 19, wherein:

said first intermediate link has a fifth end surface parallel to said third end surface;

said second intermediate link has a sixth end surface parallel to said fourth end surface;

when said injection cavity mold is clamped, part of said first and second intermediate links and said first and second fixed links are aligned on the line joining said injection nozzle to said sprue, and said fifth end surface of said first intermediate link and said sixth end surface of said second intermediate link are brought into close contact by nozzle contact pressure of said injection nozzle.

\* \* \* \* \*